US012668190B2

(12) United States Patent
Theis et al.

(10) Patent No.: US 12,668,190 B2
(45) Date of Patent: Jun. 30, 2026

(54) ACCESS SYSTEM WITH SHUTDOWN UNIT

(71) Applicant: Bode—Die Tür GmbH, Kassel (DE)

(72) Inventors: Christoph Theis, Bad Wildungen (DE);
Marco Cimmino, Adelebsen (DE);
Ulrich Arend, Dickershausen (DE);
Torben Kunzemann, Naumburg (DE)

(73) Assignee: BODE—DIE TÜR GMBH, Kassel (DE)

( * ) Notice: Subject to any disclaimer, the term of this patent is extended or adjusted under 35 U.S.C. 154(b) by 196 days.

(21) Appl. No.: 18/819,717

(22) Filed: Aug. 29, 2024

(65) Prior Publication Data

US 2025/0074315 A1      Mar. 6, 2025

(30) Foreign Application Priority Data

Aug. 31, 2023    (DE) ..................... 20 2023 104 989.3

(51) Int. Cl.
B60R 3/02          (2006.01)
E05B 85/26        (2014.01)

(52) U.S. Cl.
CPC ................ B60R 3/02 (2013.01); E05B 85/26 (2013.01)

(58) Field of Classification Search
CPC .......... B60R 3/02; B60R 3/005; B60R 3/002; B60R 3/00; E05B 85/26; E05B 85/24; E05B 85/20; B62K 13/04; B61D 23/02
See application file for complete search history.

(56) References Cited

U.S. PATENT DOCUMENTS 10,737,703 B2 *  8/2020  Sakurai ..................... B61B 1/02
11,142,226 B2 *  10/2021  Dagenais ............... B61K 13/04

FOREIGN PATENT DOCUMENTS

EP          3434547 A1      1/2019
FR          2226298 A1      11/1974
FR          2738197 A1      3/1997
JP          2016159755 A    9/2016

* cited by examiner

*Primary Examiner* — John D Walters
(74) *Attorney, Agent, or Firm* — CANTOR COLBURN LLP

(57)          ABSTRACT

An access system for a vehicle includes a step plate and an ejection unit effectively connected with the step plate, wherein the step plate is displaced along a displacement axis.
The system has
  a shutdown unit permanently fastened to the vehicle, with a sickle-shaped, rotatable lever, rotatable from an operating position into a shutdown position and back again,
  a locking bolt arranged on the step plate, which is then reached behind by the lever and, by further rotating the lever along the displacement axis while performing a displacement movement, moved from an extended position toward a retracted position.
The lever is in the shutdown position if the step plate has been completely retracted into the step plate arrangement, whereby the step plate is positively secured against a displacement in the extension direction of the step plate by the lever, which is manually rotated via an outwardly accessible contact area.

13 Claims, 8 Drawing Sheets

32

30

ACCESS SYSTEM WITH SHUTDOWN UNIT

CROSS-REFERENCE TO RELATED APPLICATIONS

This application claims the benefit of German patent application 20 2023 104 989.3 filed 31 Aug. 2023, the disclosure of which is incorporated herein by reference in its entirety.

TECHNICAL FIELD

The present disclosure relates to an access system for a vehicle, in particular for a rail vehicle, comprising a step plate arrangement arranged in a linearly displaceable manner with a step plate and an ejection unit effectively connected with the step plate, in which the step plate can be moved along a displacement axis from a retracted position to an extended position and vice versa during the performance of a displacement movement.

BACKGROUND

In vehicles of different kinds, but in particular in public transportation vehicles, use is made of access system designed as described at the outset or similarly thereto. In the present case, a "vehicle" can be understood in particular as a wheeled or rail vehicle. Within the present context, wheeled vehicles can involve in particular transport vehicles for public transportation, for example buses. In the present factual connection, rail vehicles can likewise involve transport vehicles for public transportation, for example streetcars, suburban trains, trains (regional trains, long-distance trains), subways, trams, etc. However, access devices can basically be used in vehicles of any kind, in which a height difference or a gap between a stopping platform and a tread surface inside of the vehicle must be overcome during the entry or egress of persons. For example, such a situation can also arise when an airplane stops at a gate or stopping platform of the gate, which is why use can also be made of access systems in airplanes.

Accordingly, access systems are used to facilitate entry and egress in a vehicle of the previously described kind. Sliding step systems and folding step systems are well known from prior art.

Sliding step systems are based upon moving a step plate back and forth between a retracted and an extended position, in particular along a displacement axis extending in the transverse direction of the vehicle. In the extended position, the step plate provides a tread surface which a person can use to enter or exit the vehicle. In order to ensure such a linear displacement of the step plate, the step plate can be guided in a vehicle-side housing or a framework in a linearly displaceable manner by means of a guide. Sliding steps make it easier to enter and exit a vehicle by bridging a gap present between the vehicle and a stopping platform (e.g., a platform edge). Folding steps (in particular folding steps with a ramp-like design) are provided in particular to overcome height differences between a vehicle interior (e.g., a floor provided there) and a stopping platform, but can also be used to bridge a gap between the vehicle and stopping platform.

In a closed position, sliding step systems are standardly locked with the help of a device and/or a safety position switch, so that they are safely stowed away while traveling. This lock must be released in the event the vehicle is shut down. It must also be possible to manually move the step plate or the sliding step into the step plate arrangement and secure it there. The step plate is often automatically locked in the inserted position. Finally, it is necessary that the locking control signal of the sliding step be bridged with the help of an external switch.

Alternatively, there are also shutdown concepts in which the step plate is locked with the help of a scribe after manually inserted, and this locked position is monitored with the help of a switch.

However, the previously known shutdown concepts can only absorb a very limited force, and require that the system already be in a closed position. In addition, it often happens that the system is not closed tightly enough. This is problematic in particular in express trains, since a high system tightness is extremely important due to the high pressure fluctuations, in particular in tunnels. In addition, the step plate in many instances closes a flap of the sliding step system, which forms a seal against the door or the door wing from outside. While traveling, the sealing flap is held in a closed, sealing position by the locked step plate. Arising loads on the sealing flap owing to pressure fluctuations or aerodynamic loads are thus transmitted to the step plate and locking mechanism of the access aid.

SUMMARY

Accordingly, the present disclosure provides an access system which makes it possible to easily and safely transfer the step plate arrangement into a shutdown position. The access system is to safely close in the shutdown unit and sufficiently seal the vehicle.

It is proposed that this advantage be achieved by providing an access system having the features as disclosed herein.

Let it be noted that the features individually enumerated in the claims can be combined with each other in any technically feasible manner, and indicate further configurations of the disclosure. The description additionally characterizes and specifies the disclosure in particular in conjunction with the figures.

Therefore, the shutdown unit consists of a permanently mounted unit, which has the sickle-shaped, rotatable lever. The locking bolt is located on the step plate or movable part of the ejector, and can be pulled in the direction of the vehicle by turning the lever that contacts the locking bolt. For this purpose, the lever is arranged in such a way that, as the lever rotates, it can then reach behind the locking bolt and pull it in the direction of the vehicle due to the positioning of the axis of rotation of the lever relative to the locking bolt and the curvature of the lever once the locking bolt has been retracted far enough into the step plate arrangement. In a preferred embodiment variant, the end-side axis of rotation of the lever is arranged to the side of the displacement axis in relation to the displacement axis or displacement direction of the locking bolt. Alternatively or additionally, it is also possible that the sickle-shaped lever have no uniform curvature, but rather one that changes in its progression, for example increases. What is essential is that turning the lever causes the locking bolt to be tightened.

The special contour of the lever makes it possible to overcome elevated resistances, e.g., caused by seals, at a low force expenditure. Given a completely closed position, the shutdown position, a shutdown switch is activated, signaling that the step plate is properly positioned in the access system or possibly in a housing of the access system.

In the shutdown position, the lever positively secures the step plate against displacement in the extension direction of the sliding step.

In the closed position, the component dimensioning allows the shutdown system to absorb all aerodynamic loads transmitted by the sealing flap. The high load capacity of the shutdown system enables its integration into the safety loop of the vehicle.

Turning the sickle-shaped lever thus makes it possible to pull the step plate into the shutdown position. The lever can here be manually rotated via an outwardly accessible contact area. For example, this contact area can be formed by an upright axis of rotation of the lever, which can be contacted from above, meaning in the area of the vehicle floor. One possible example is a design that enables the use of a tool, for example a screwdriver, an Allen key or a similar tool. Alternatively, the contact area can be designed in such a way that the axis of rotation, and hence the lever, can be rotated by hand, for example with the help of a rotary wheel.

It is further possible to provide a spring element in the area of the axis of rotation, which either supports turning the lever in the direction of the shutdown position or turning the lever back to the starting position. The spring element is also used to realize a latching position in an open or closed position.

One advantageously provided pawl makes it impossible to turn the lever into the shutdown position if the lever has not reached behind the locking bolt. This is the case when the step plate has been extended too far, and the lever is rotated past the latter before the locking bolt.

This pawl is rotatably mounted, and can assume a basic position and a locking position. In the basic position, the lever can reach behind the locking bolt of the step plate and tighten it. In the locking position, the lever is prevented from turning by the pawl. A spring element causes the pawl to move into the locking position if it is not being blocked.

Depending on its position, the locking bolt provided on the step plate causes the pawl to become blocked. If the step plate is moved in the direction of the vehicle, the locking bolt contacts the pawl on a lateral surface, turns it in its basic position, and finally holds it in this position. As already explained, it is only in this position that the lever can reach behind the locking bolt and tighten the step plate.

Conversely, if the step plate is in an extended position, the locking bolt is not engaged with the pawl. The pawl is held in position by a bolt on the sickle-shaped lever. If the lever is rotated in this situation, it comes into contact with the pawl, which prevents a continued turning into the shutdown position. In turn, this also prevents the shutdown switch from being able to acquire and relay a proper position of the retracted step plate. As a consequence, this missing signal can prevent the vehicle from traveling with a defective step plate.

In an especially preferred embodiment variant, the free end of the lever has a lever bolt, which corresponds with the pawl in such a way that the pawl blocks the rotational movement of the lever in the direction of the shutdown position through contact with the lever bolt.

The pawl can preferably have an indentation for receiving the lever bolt, which is designed and arranged in such a way that the lever in its rotational movement in the direction of the shutdown position is received in the indentation and blocked if the locking bolt arranged on the step plate is not engaged with the pawl, and the pawl is in its locking position.

In a preferred embodiment variant, the pawl in its basic position is arranged and aligned in such a way that the indentation is open in an insertion direction, and its main extension axis is essentially aligned along the displacement axis of the step plate. The locking bolt arranged on the step plate is arranged laterally offset to the pawl on the step plate in a horizontal plane, so that it can be moved past the pawl and the indentation in the displacement direction. If the step plate is inserted far enough, the locking bolt in its second and third positions is located to the side of the lateral surface of the pawl, which prevents the pawl from moving into the locking position.

In its locking position, the indentation is located on a movement path of the lever bolt, and is open in its shutdown position opposite to the direction of movement, so that the lever bolt can be moved into the indentation.

The rear area of the lever facing its axis of rotation can preferably have a retaining indentation, in which the lever bolt is in the shutdown position, and thereby positively locked in the displacement direction of the step plate. The lever bolt can only assume this position if the movement is not blocked by the pawl.

The formulation that the locking bolt is fastened to the step plate also includes an indirect fastening to the step plate, for example to additional elements of the step plate. The same applies analogously for the lever bolt, which is fastened to the free end of the lever.

The ejection unit is guided in a linearly displaceable manner in a guiding device provided in a vehicle by way of a suitable guide, for example a roller or rail guide. The step plate, for example its bottom side, can also be guided in a linearly displaceable manner or arranged in a guiding device provided in a vehicle by way of a guide, for example a roller or rail guide. The mentioned drive unit is preferably directly connected with the step plate or a component fastened thereto, for example a step plate carrier. The effective connection established between the step plate and ejection unit allows the ejection unit to be taken along during the linear displacement of the step plate along the displacement axis, i.e., the drive unit can induce a linear displacement of the step plate and the ejection unit along the displacement axis, i.e., in the direction of the extended position or in the direction of the retracted position. A mechanical transmission means (e.g., a linkage or drive belt) can be provided, which is coupled with the step plate, a component connected therewith (e.g., a step plate carrier) or the ejection unit. In particular, the drive unit can be an electric motor drive. The displacement of the step plate and the ejection unit during the displacement movement of the step plate arrangement is rectified and simultaneous. In addition, the displacement of the ejection unit and step plate takes place at the same speed.

Additional advantageous configurations of an access system according to the disclosure arise from the features indicated in the subclaims as well as those described below.

BRIEF DESCRIPTION OF THE DRAWINGS

Additional features and advantages of the disclosure arise from the following description of an exemplary embodiment of the disclosure not to be understood as limiting, which will be described in more detail below with reference to the drawings. Schematically shown in this drawing are.

DETAILED DESCRIPTION OF THE DRAWINGS

Figure 1:
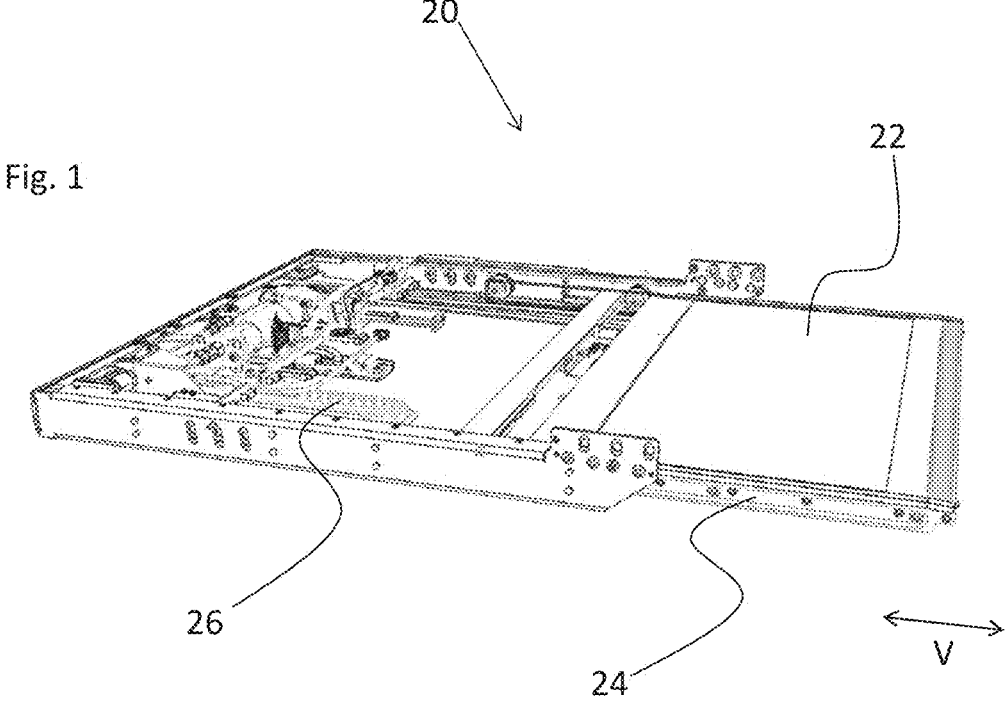
FIG. 1 a perspective view of a first exemplary embodiment of an access system according to the disclosure, wherein the accompanying step plate arrangement is in a partially extended position.

Shown on FIG. 1 is a perspective view of a first exemplary embodiment of an access system according to the disclosure. The access system is used as an entry and egress aid in a vehicle not shown, or is integrated into the vehicle. In particular, the vehicle is a rail vehicle. In such a vehicle, access systems are as a rule arranged in the side area of the vehicle, so as to allow persons access from a stopping platform located to the side of the vehicle.

The access system comprises a step plate arrangement 20 arranged in a linearly displaceable manner, which is composed of a step plate 22 and an ejection unit 24 effectively connected with the step plate 22. As a person enters or exits, the step plate 22 is tread-loaded, i.e., exposed to the weight force of the person. A drive unit 26 can be used to move the step plate 22 along a displacement axis V while performing a displacement movement from a retracted position to an extended position and vice versa. The step plate 22 is positioned in the extended position on FIG. 1.

Figure 2:
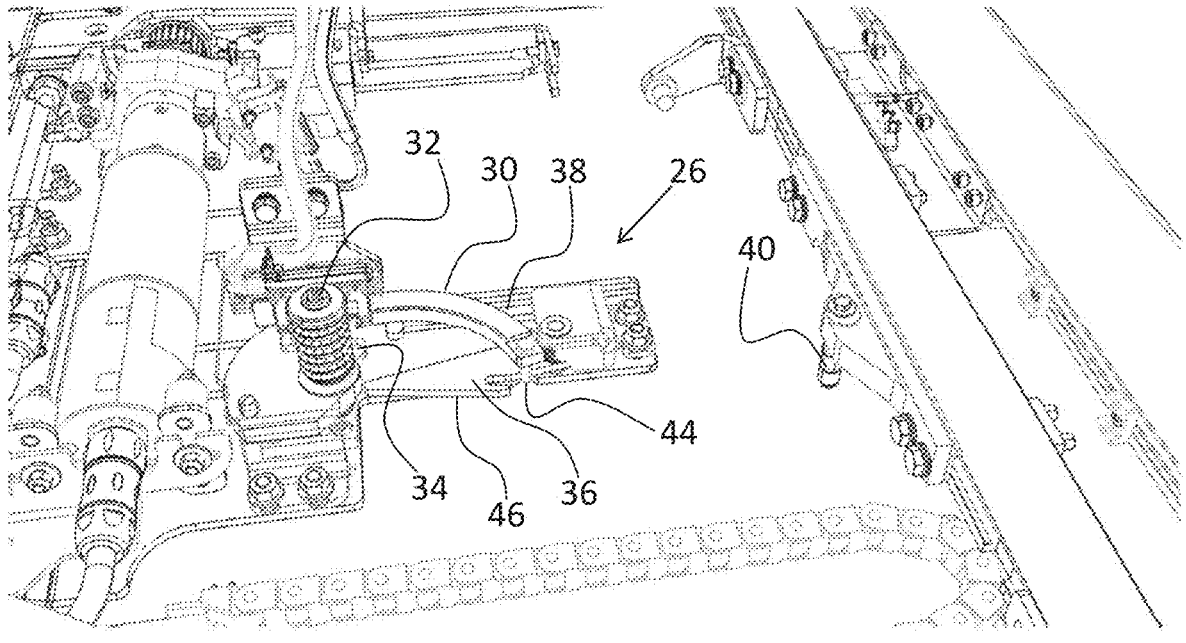
FIG. 2 a perspective view of essential components of the access system according to the disclosure.

FIG. 2 illustrates the structural design of the access system according to the disclosure with shutdown unit 28 permanently attached to the vehicle, with a sickle-shaped, rotatable lever 30 which can be moved from an operating position (see FIG. 1) to a shutdown position (see FIG. 8) and back. The drive of the rotational movement here takes place manually via an outwardly accessible contact area 32, which is arranged in the area of an axis of rotation of the lever 30. For this purpose, the contact area 32 has a receptacle for a square key.

As evident on the figures, the contact area 32 or the axis of rotation of the lever 30 is provided with a spring element 34, which exposes the lever 30 to a spring force that acts in the direction of the operating position of the lever 30. The spring element 34 produces a latching.

Further visible is a pawl 36, which likewise is fastened to a fixed carrier 38 of the access system in a rotatable and spring-loaded manner. The pawl 36 can be swiveled from a basic position (see FIG. 2) into a locking position (see FIG. 6).

A locking bolt 40 is provided on the step plate 22, and can be moved with the step plate 22 along the displacement axis V.

Figure 3:
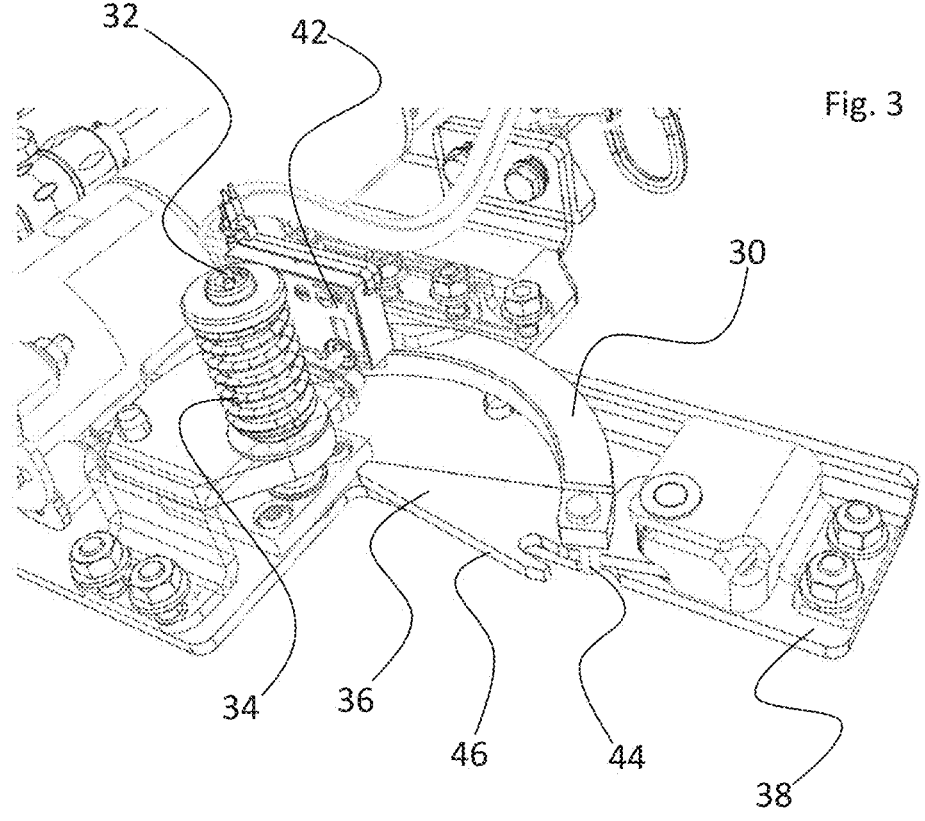
FIG. 3 a perspective, magnified view of a shutdown unit according to the disclosure fixedly arranged on the vehicle.

FIG. 3 shows a perspective, magnified view of the shutdown unit 28 fixedly arranged on the vehicle. It reveals a shutdown switch 42, which is activated when a lever bolt 44 arranged at the free end of the lever 30 is situated in the shutdown position. The shutdown switch 42 can generate and relay a signal, which signals a proper shutdown position to the train control system.

Figure 4:
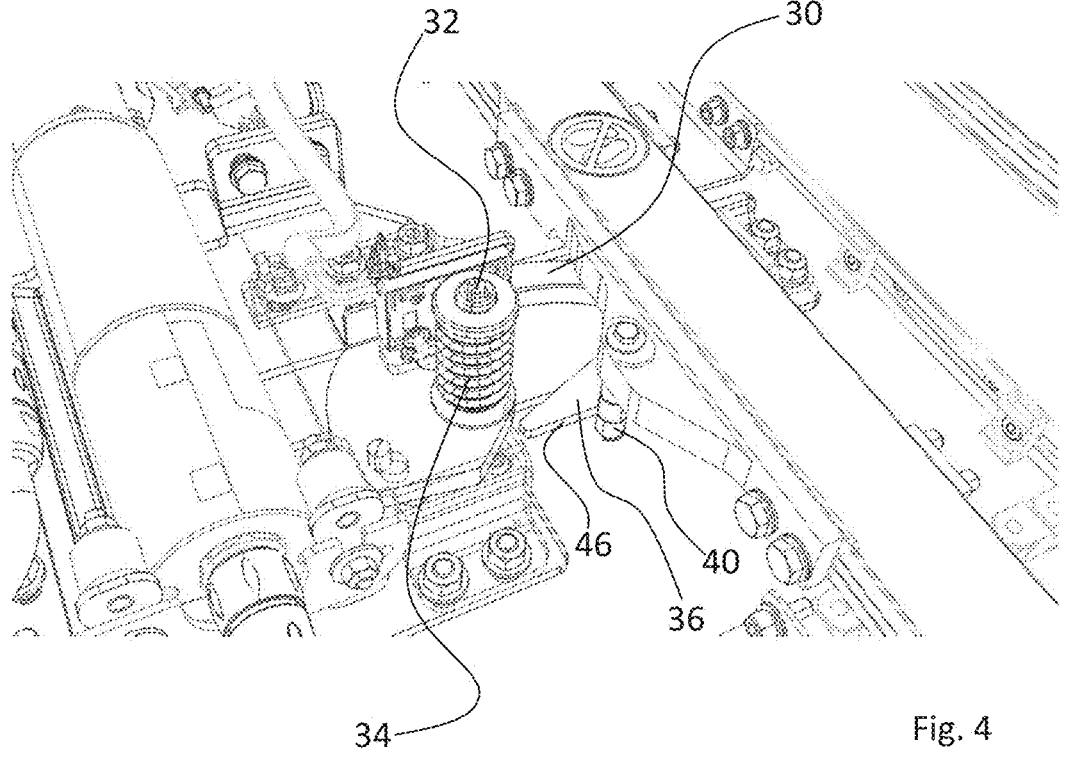
FIG. 4 a perspective and magnified view from above of essential components of the access system according to the disclosure with a pawl in the basic position.
Figure 5:
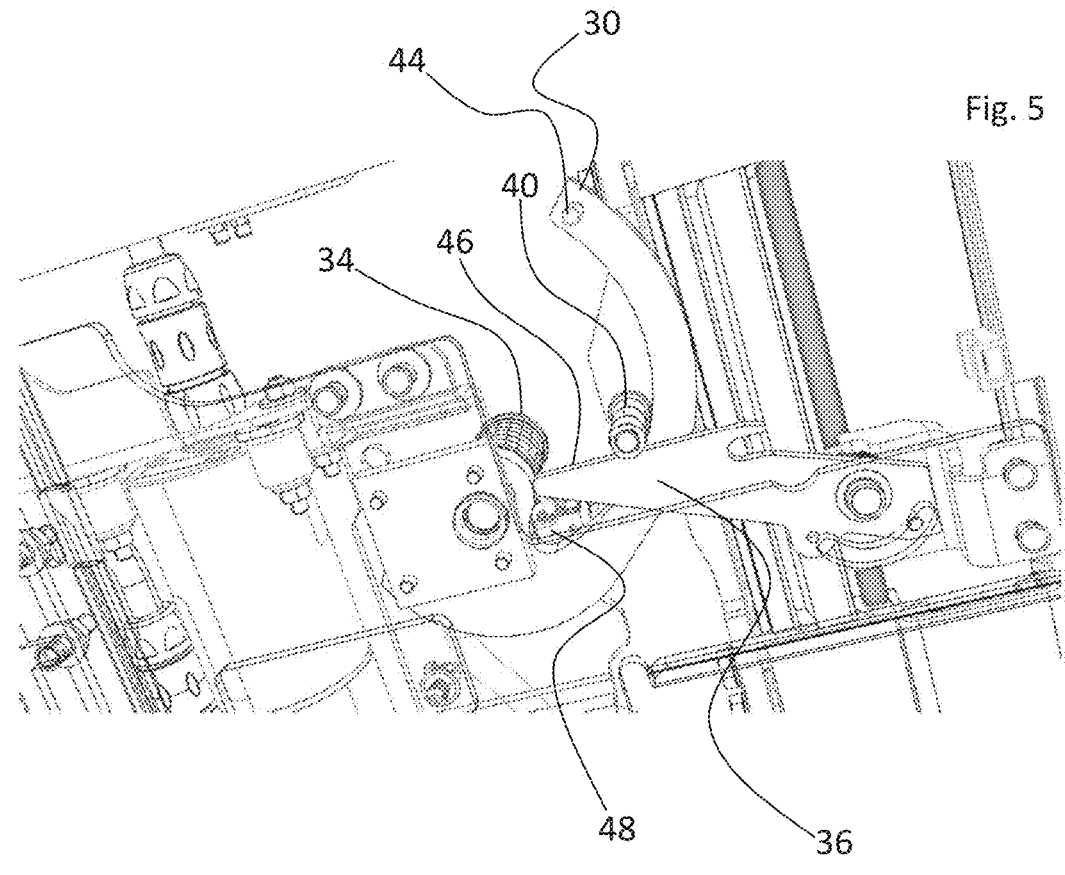
FIG. 5 a perspective and magnified view from below of essential components of the access system according to the disclosure with a pawl in the basic position with screwed-in lever.

FIGS. 4 and 5 show the step plate arrangement 20 in the position in which the pawl 36 is in its basic position. FIG. 4 shows the situation from above, FIG. 5 from below. As evident, the locking bolt 40 contacts a lateral surface 46 of the pawl 36, and thereby holds it in its basic position. The locking bolt 40 can be moved along the lateral surface 46. In this position, the step plate 22 is located far enough in the step plate arrangement, so that the lever 30 can reach behind the locking bolt 40 (see FIG. 5). Rotating the lever 30 pulls the locking bolt 40 in the direction of the vehicle, meaning into the step plate arrangement 20.

Figure 6:
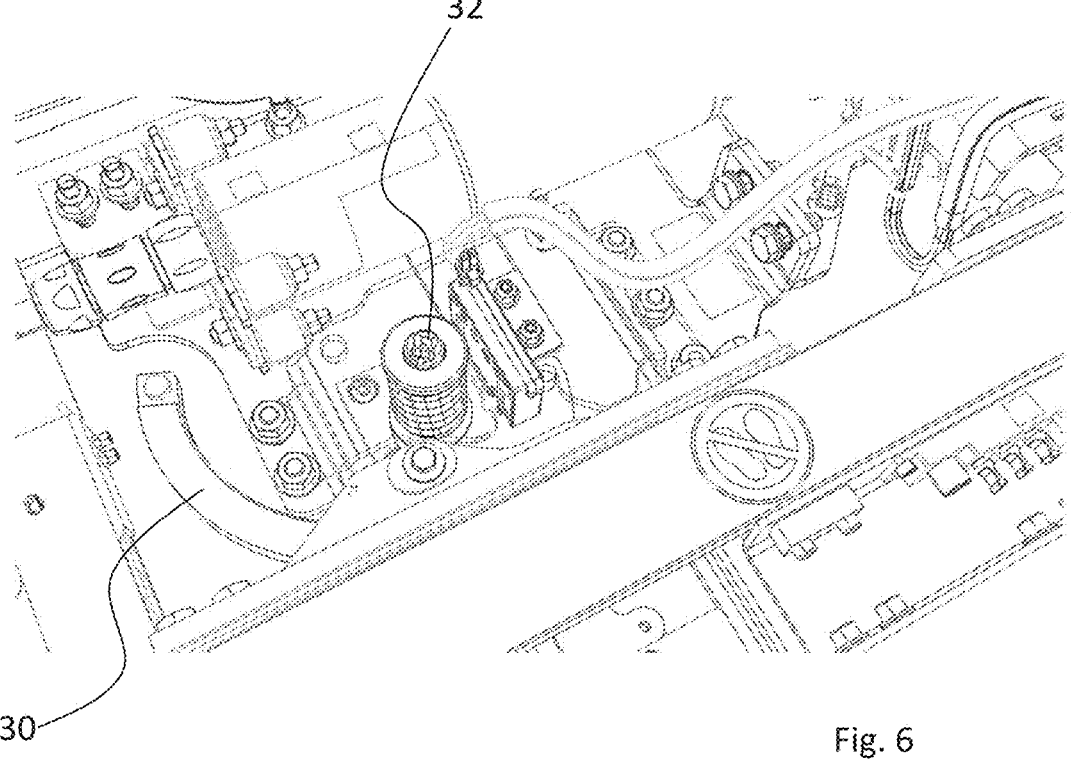
FIG. 6 a perspective and magnified view from above of essential components of the access system according to the disclosure in the shutdown position.
Figure 7:
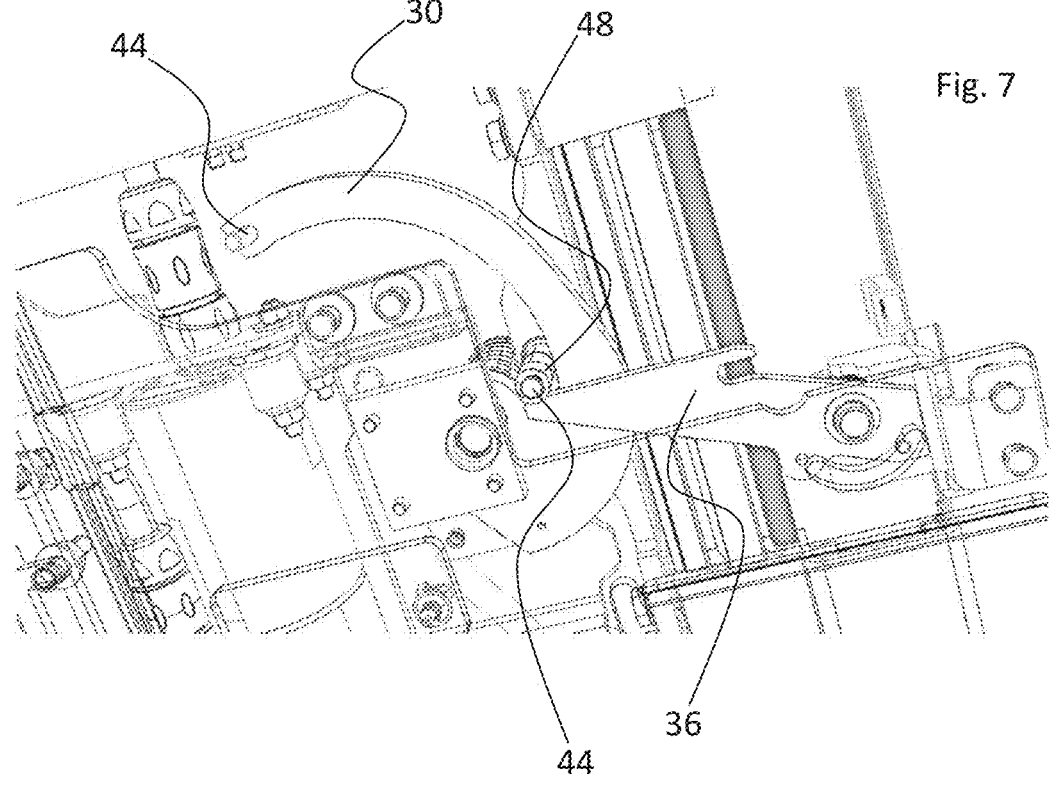
FIG. 7 a perspective and magnified view from below of essential components of the access system according to the disclosure in the shutdown position.

FIGS. 6 and 7 show the situation in which the step plate arrangement is in the shutdown position. As evident, the locking bolt 40 is located in a retaining indentation 48 of the lever 30. The retaining indentation 48 holds the locking bolt 40, and positively blocks it in against extending along the displacement axis V.

Figure 8:
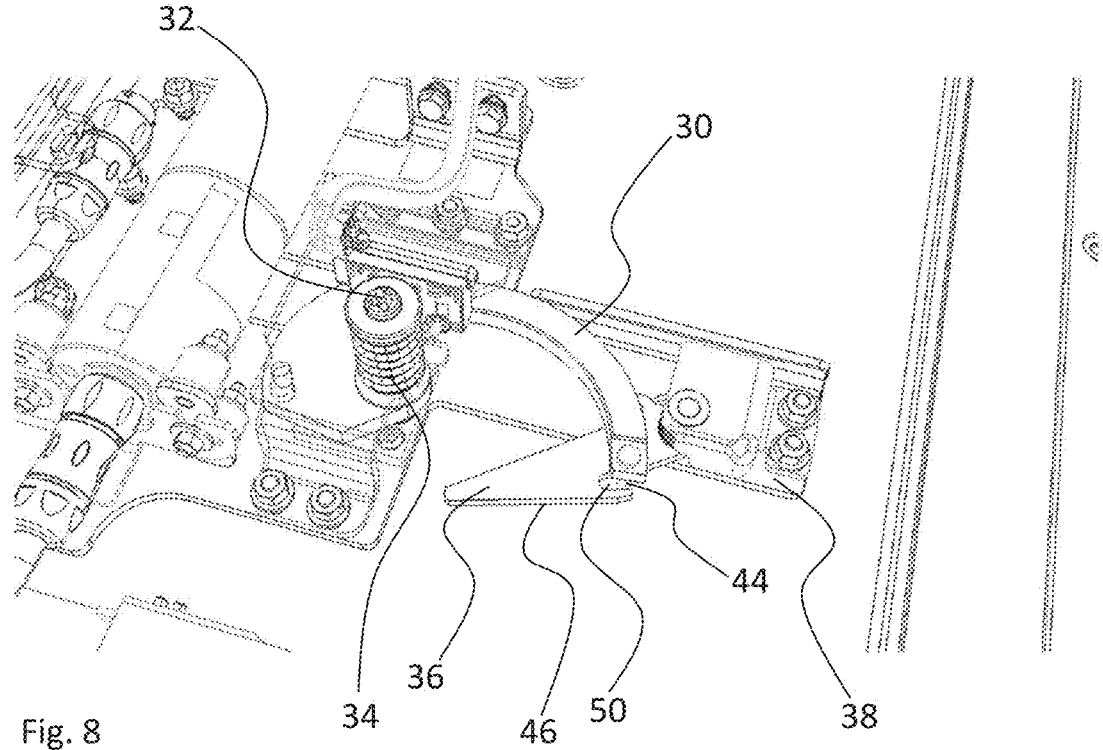
FIG. 8 a perspective and magnified view from above of essential components of the access system according to the disclosure with pawl in the locked position.

FIG. 8 shows the pawl 36 in a locking position from above. As evident, the latter is positioned swiveled out laterally over the carrier 38. The lever bolt 44 is located in an indentation 50 of the pawl 36, and is thereby secured against further rotation in the direction of the shutdown position. This precludes the shutdown switch 42 from detecting a correct position of the retaining bolt, even though the step plate 22 was not retracted properly.

The figures further illustrate that the design and arrangement of the lever 30 and the locking bolt 40 are selected in such a way that a rotational movement of the lever 30 causes the locking bolt 40 to tighten along the displacement axis V.

The invention claimed is:

1. An access system for a vehicle, comprising a step plate and an ejection unit effectively connected with the step plate, in which the step plate can be moved along a displacement axis from a retracted position to an extended position and vice versa during the performance of a displacement movement, whereby:

a shutdown unit permanently fastened to the vehicle, with a sickle-shaped, rotatable lever, which is configured to be rotated from an operating position to a shutdown position and back again, a locking bolt arranged on the step plate, which is configured to be reached behind by the sickle-shaped, rotatable lever and, by further rotating the sickle-shaped, rotatable lever along the displacement axis while performing a displacement movement, moved from an extended position toward a retracted position once it has been retracted far enough into the step plate arrangement, wherein the sickle-shaped, rotatable lever is in the shutdown position if the step plate has been completely retracted into the step plate arrangement, in the shutdown position, the step plate is positively secured against a displacement in the extension direction of the step plate by the lever, the lever is configured to be manually rotated via an outwardly accessible contact area.

2. The access system according to claim 1, wherein the latter has a pawl that is configured to be swiveled from a basic position into a locking position, which is arranged and designed such that a rotational movement of the lever is blocked in the locking position of the pawl in a shutdown position, wherein the locking bolt, in a first position in which the step plate has not been retracted far enough into the step plate arrangement, allows the pawl to move into the locking position, and in a second position in which the step plate has been largely, but not yet completely, retracted into the step plate arrangement, prevents the pawl from moving into the locking position and holds it in the basic position, and in a third position in which the step plate has been completely retracted into the step plate arrangement and the lever is in the shutdown position, holds the pawl in the basic position, and is positively secured by the lever against displacement in the extension direction of the sliding step.

3. The access system according to claim 2, wherein the pawl is spring-loaded such that the pawl rotates in the direction of the shutdown position into the locking position when the locking bolt arranged on the step plate is not engaged with the pawl.

4. The access system according to claim 2, wherein the lever has a lever bolt, which corresponds with the pawl such that the pawl blocks the rotational movement of the lever in the direction of the shutdown position through contact with the lever bolt.

5. The access system according to claim 4, wherein the pawl has an indentation for receiving the lever bolt, which is designed and arranged such that the lever is received and blocked in the indentation in its rotational movement in the direction of the shutdown position when the locking bolt arranged on the step plate is not engaged with the pawl and the pawl is in its locking position.

6. The access system according to claim 5, wherein the pawl is arranged and aligned in its basic position such that the indentation is open in the insertion direction and its main extension axis is aligned essentially along the displacement axis of the step plate, and the locking bolt arranged on the step plate is arranged laterally offset to the pawl on the step plate in the horizontal plane, so that the latter is configured to be moved past the pawl and the indentation in the displacement direction, and in its second and third positions is located to the side of a lateral surface of the pawl, which prevents the pawl from moving into the locking position and holds it in the basic position.

7. The access system according to claim 6, wherein the pawl is arranged and aligned in its locking position such that the indentation is located on a movement path of the lever bolt, and is open in its shutdown position opposite to the direction of movement of the lever, so that the lever bolt is configured to be moved into the indentation, and the pawl prevents the lever from moving in its shutdown position.

8. The access system according to claim 1, wherein the rear area of the lever has a retaining indentation in which the lever bolt is in the shutdown position, and thereby positively locked in the displacement direction of the step plate.

9. The access system according to claim 1, wherein the lever is exposed to a spring force via a spring element, wherein the spring force acts opposite the movement in the shutdown position.

10. The access system according to claim 1, wherein a shutdown switch is provided, and activated when the lever is in the shutdown position, which causes the shutdown switch to generate and relay a signal, to a train control system.

11. The access system according to claim 10, wherein the shutdown switch determines the position of the lever bolt in the retaining indentation.

12. The access system according to claim 1, wherein the contact area has a receptacle for a tool.

13. The access system according to claim 1, wherein the locking bolt arranged on the step plate and the sickle-shaped lever are arranged relative to each other such that turning the lever causes the locking bolt to be tightened in the insertion direction of the step plate.

* * * * *